(12) United States Patent
Mausolf et al.

(10) Patent No.: US 8,307,352 B2
(45) Date of Patent: Nov. 6, 2012

(54) CLASSPATH OPTIMIZATION IN A JAVA RUNTIME ENVIRONMENT

(75) Inventors: Jeffry Richard Mausolf, Austin, TX (US); Kimberly Ann Stephens, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 12/127,525

(22) Filed: May 27, 2008

(65) Prior Publication Data

US 2008/0222624 A1    Sep. 11, 2008

Related U.S. Application Data

(63) Continuation of application No. 11/225,572, filed on Sep. 13, 2005, now abandoned.

(51) Int. Cl.
    *G06F 9/45* (2006.01)
(52) U.S. Cl. ........................................ 717/152
(58) Field of Classification Search .................. 717/166, 717/176, 114, 152; 725/152
    See application file for complete search history.

(56) References Cited

U.S. PATENT DOCUMENTS

| | | | |
|---|---|---|---|
| 6,429,860 B1 * | 8/2002 | Hughes | 345/418 |
| 6,470,494 B1 | 10/2002 | Chan et al. | |
| 6,571,388 B1 | 5/2003 | Venkatraman et al. | |
| 6,571,389 B1 * | 5/2003 | Spyker et al. | 717/176 |
| 2003/0070158 A1 * | 4/2003 | Lucas et al. | 717/114 |
| 2003/0217369 A1 * | 11/2003 | Heredia | 725/152 |
| 2004/0015936 A1 | 1/2004 | Susarla et al. | |
| 2004/0168163 A1 | 8/2004 | Choi et al. | |

OTHER PUBLICATIONS

Sun Synopsis, "Jar—(i) The Java Archive Tool" p. 1-6 and (ii) "Setting the Class Path" p. 1-4, Synopsis, Sun Microsystems, copyright 2001-2002.*
Sun Synopsis, "jar—the Java Archive Tool" and "Setting the Class path", synopsis, copyright 2001-2002, 9 pages (Sun_Synopsis.pdf).
USPTO Office Action for U.S. Appl. No. 11/225,572 dated Aug. 26, 2009.

* cited by examiner

*Primary Examiner* — Tuan Anh Vu
(74) *Attorney, Agent, or Firm* — Yee & Associates, P.C.; Mark C. Vallone

(57) ABSTRACT

A computer implemented method, data processing system, and computer usable program are provided by the aspects of the present invention. Aspects of the present invention identify required classes of a software program in the import statements in the source code. Next, the aspects of the present invention identify an element in a classpath environment variable that contain only the required classes and generate a new classpath environment variable with the identified element. Aspects of the present invention then store the new classpath environment variable in a classpath file that is specific to the software program for subsequent invocation.

14 Claims, 6 Drawing Sheets

FIG. 5
*(PRIOR ART)*

```
setenv CONDOR_LOCATION /home/utexas/staff/mausolf/mycondor
setenv JAVA_HOME /usr/java/j2sdk1.4.1_05
set DIRLIBS=(${CONDOR_LOCATION}/lib/gt3/lib/*.jar)
set CP=".:${CONDOR_LOCATION}/lib:${JAVA_HOME}/jre/lib/rt.jar"
foreach i (${DIRLIBS})
    set CP = ${CP}:"$i"
end
if ( ! $?CLASSPATH ) then
    setenv CLASSPATH ${CP}
else
    setenv CLASSPATH ${CP}:${CLASSPATH}
endif
```

- 500: entire block
- 501: `set CP=".:${CONDOR_LOCATION}/lib:${JAVA_HOME}/jre/lib/rt.jar"`
- 502, 506: segments of line 501
- 504: foreach loop

FIG. 7

CLASSPATH = /user/local/classes; /user/local/lib;

```
file test.java package com.ibm.my_project.my_subsystem;

Import com.ibm.my_project.registration;
Import com.ibm.my_project.utilities;
```

- 800: `#file test.java`
- 802: `Import com.ibm.my_project.registration;`
- 804: `Import com.ibm.my_project.utilities;`

FIG. 9

CLASSPATH = /user/local/lib/runtime.jar; /user/local/lib/my_project.jar

- 900, 902, 904

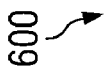

FIG. 6
*(PRIOR ART)*

```
laredo:~/mycondor% source condor.cshro
.:/home/utexas/staff/mausolf/mycondor/lib:/usr/java/j2sdk1.4.1_05/jre/lib/rt.jar:/home/utexas/staff/mausolf/mycondor/lib/gt3
/mycondor/lib/gt3/lib/cryptix-asn1.jar:/home/utexas/staff/mausolf/mycondor/lib/gt3/lib/cryptix.jar:/home/utexas/staff/mausolf
r/lib/gt3/lib/mds-providers.jar:/home/utexas/staff/mausolf/mycondor/lib/gt3/lib/mjs.jar:/home/utexas/staff/mausolf/mycondor
home/utexas/staff/mausolf/mycondor/lib/gt3/lib/xalan.jar/home/utexas/staff/mausolf/mycondor/lib/gt3/lib/xe
rcesImpl.jar:/home/utexas/staff/mausolf/mycondor/lib/gt3/lib/xindice-1.1b3.jar:/home/utexas/staff/mausolf
mycondor/lib/gt3/lib/xindice-servicegroup.jar:/home/utexas/staff/mausolf/mycondor/lib/gt3/lib/xindice-servi
cegroup-stub.jar:/home/utexas/staff/mausolf/mycondor/lib/gt3/lib/xml-apis-1.1.jar:/home/utexas/staff/maus
olf/mycondor/lib/gt3/lib/xmldb-api-20021118.jar:/home/utexas/staff/mausolf/mycondor/lib/gt3/lib/xmldb-api
-sdk-20021118.jar:/home/utexas/staff/mausolf/mycondor/lib/gt3/lib/xmldb-common.jar:/home/utexas/staff/
mausolf/mycondor/lib/gt3/lib/xmldb-xupdate.jar:/home/utexas/staff/mausolf/mycondor/lib/gt3/lib/xmlParser
APIs.jar:/home/utexas/staff/mausolf/mycondor/lib/gt3/lib/xmlrpc-1.1.jar:/home/utexas/staff/mausolf/mycon
dor/lib/gt3/lib/xmlsec.jar
```

600

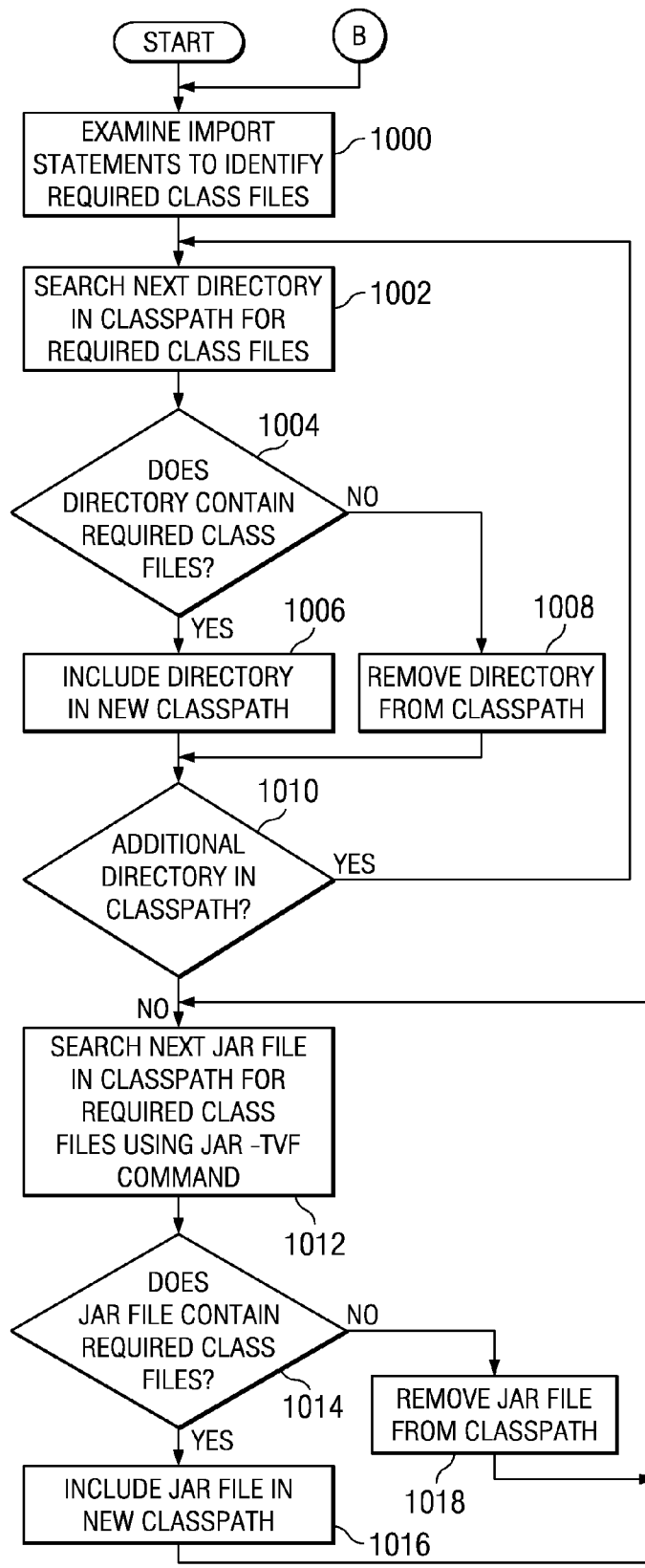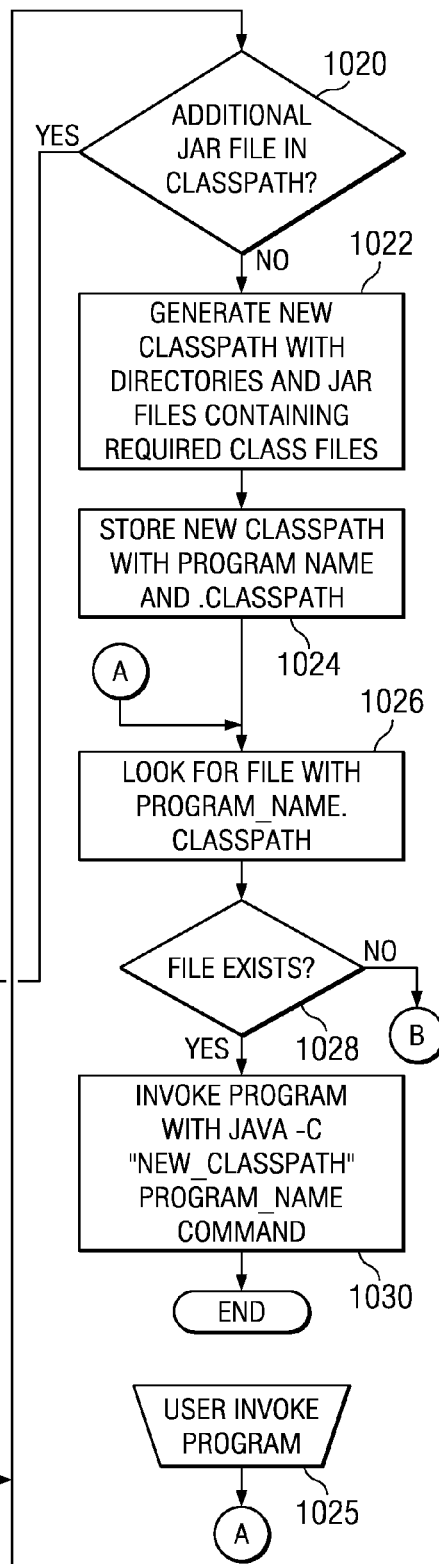
FIG. 10

CLASSPATH OPTIMIZATION IN A JAVA RUNTIME ENVIRONMENT

This application is a continuation of application Ser. No. 11/225,572, filed Sep. 13, 2005, status pending.

BACKGROUND OF THE INVENTION

1. Field of the Invention

The present invention relates generally to a data processing system. In particular, the present invention relates to a Java™ runtime environment in a data processing system. Still more particularly, the present invention relates to optimizing a classpath environment variable in the Java™ runtime environment by generating a new classpath environment variable that only includes directories containing classes that are required by a current Java™ program.

2. Description of the Related Art

In the Java™ runtime environment, when a user invokes a Java™ program, the Java™ class loader loads bootstrap classes, extension classes, and user classes. Java™ runtime environment (JRE) is a product available from Sun Microsystems, Inc. Bootstrap classes are classes of the basic Java™ platform. Extension classes are Java™ archive (JAR) files that are required by the Java™ platform. User classes are classes that are defined by program developers. Currently, the location of the user classes is identified by the classpath environment variable, which lists directories and JAR files containing class files. The classpath environment variable is typically set on a user login to be used for all of the Java™ programs.

When Java™ programs are installed, Java™ class loader loads packages containing classes that are required by the Java™ program by traversing the classpath environment variable as defined by the user. In this way, the required classes may be identified by the Java™ class loader. However, as the number of directories or JAR files defined in the classpath environment variable increases or as the number of Java™ programs increases, searching through the classpath environment variable becomes very time consuming. The number of classes or JAR files in a directory also is a factor. Thus, the number of classes, directories, and JAR files may increase as additional Java™ programs are installed.

Furthermore, some Java™ programs may be executed repeatedly with different input data. These programs include programs that process a file of credit card transactions, cumulative rainfall amounts, seismic data, images, or other types of information. These repeatedly executed programs are either time sensitive or run on resources that are constrained by usage or time. If all directories and JAR files in the classpath environment variable are searched each time one of these programs is executed, performance of the program may suffer.

Since the required classes must be loaded before the Java™ program can be executed, it would be advantageous to have the classpath environment variable that only contain relevant classes for the current Java™ program, such that the time spent searching for the required classes in the classpath environment variable may be minimized.

SUMMARY OF THE INVENTION

A computer implemented method, a data processing system, and computer usable program code are provided for classpath optimization in a platform independent runtime environment. A required class is identified in an import statement in source code for a software program, wherein the software program requires the required class. In a classpath environment variable, an element containing the required class is identified to form an identified element. Using the identified element, a new classpath environment variable is generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating a known script for setting the classpath environment variable;

FIG. 6 is a diagram illustrating a known classpath environment variable generated;

FIG. 7 is a diagram illustrating a known classpath environment variable;

FIG. 8 is a diagram illustrating a known Java™ program source file;

FIG. 9 is a diagram illustrating an exemplary classpath environment variable generated by the aspects of the present invention in accordance with an illustrative embodiment of the present invention;

FIG. 10 is a flowchart of an exemplary process for classpath environment variable optimization in accordance with an illustrative embodiment of the present invention.

DETAILED DESCRIPTION OF THE PREFERRED EMBODIMENT

Figure 1:
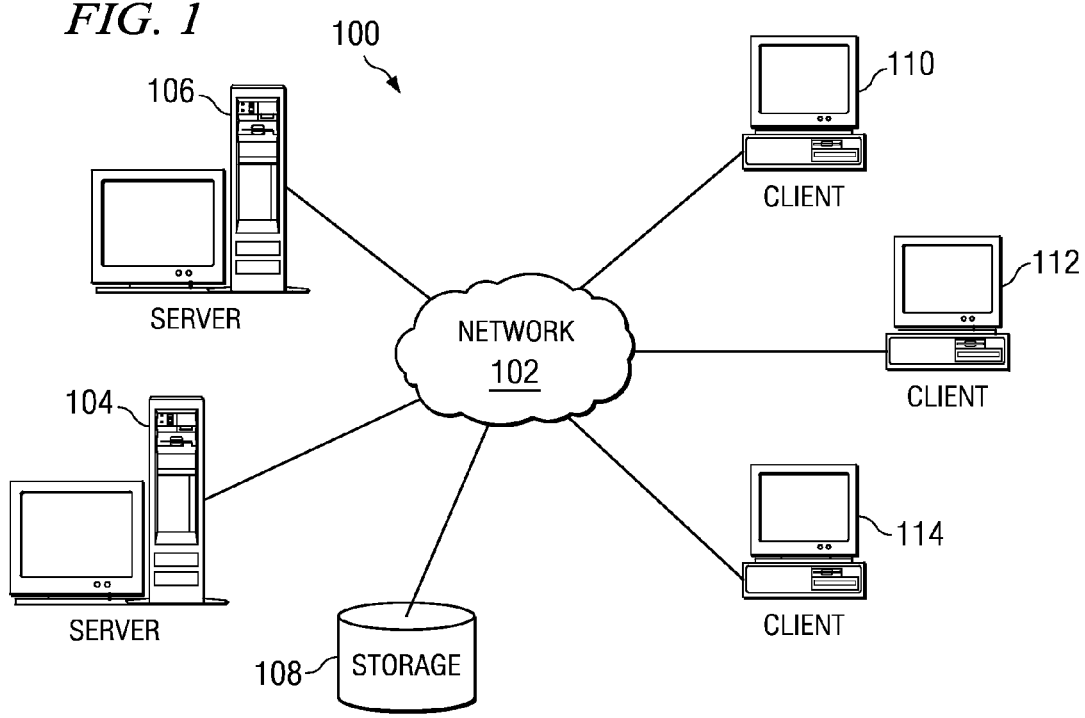
FIG. 1 is a block diagram of a data processing system in which exemplary aspects of the present invention may be implemented.
Figure 2:
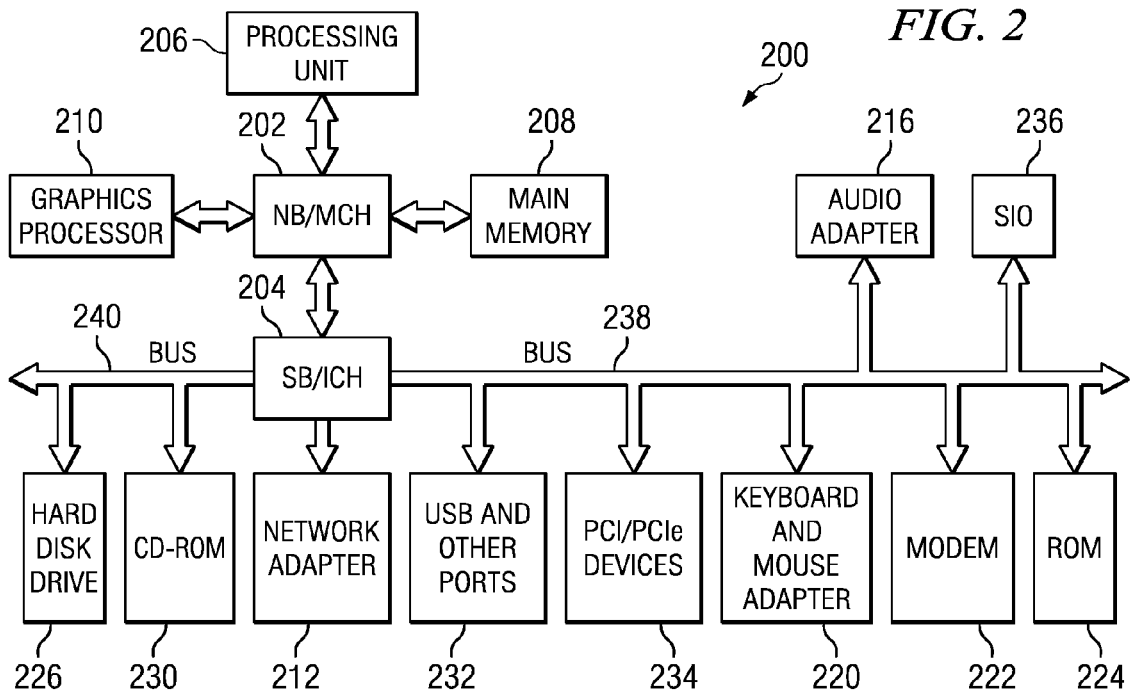
FIG. 2 is a diagram illustrating interactions between aspects of the present invention in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, network adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as, the Java™ programming system, may run in conjunction with the operating system and provides calls to the operating system from Java™ programs or applications executing on data processing system 200 (Java™ is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or the LINUX operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 as shown in FIG. 2. A memory may be, for example, main memory 208, ROM 224, or a cache such as found in NB/MCH 202 as shown in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
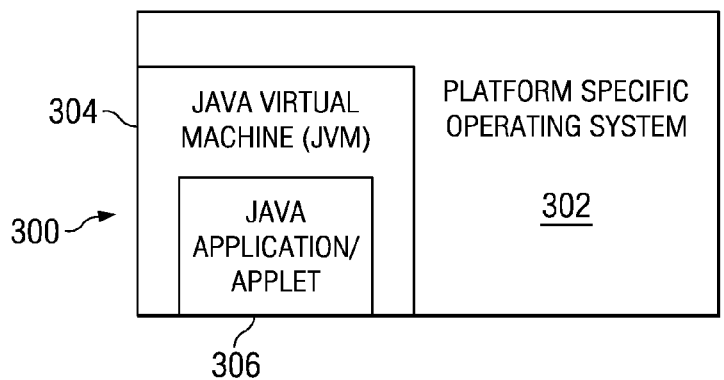
FIG. 3 is a block diagram illustrating the relationship of software components operating within a computer system invention in accordance with an illustrative embodiment of the present invention.

With reference now to FIG. 3, a block diagram illustrating the relationship of software components operating within a computer system that may implement the present invention. Java™-based system 300 contains platform specific operating system 302 that provides hardware and system support to software executing on a specific hardware platform. Java™ Virtual Machine (JVM™) 304 is one software application that may execute in conjunction with the operating system. JVM™ 304 provides a Java™ run-time environment with the ability to execute Java™ application or applet 306, which is a program, servlet, or software component written in Java™ programming language. The computer system in which JVM™ 304 operates may be similar to data processing system 200 or network data processing system 100, as described above. However, JVM™ 304 may be implemented in dedicated hardware on a so-called Java™ chip, Java™-on-silicon, or Java™ processor with an embedded pico Java™ core.

At the center of a Java™ run-time environment is the JVM™, which supports all aspects of Java™'s environment, including its architecture, security features, mobility across networks, and platform independence. The JVM™ is a virtual computer component that actually executes Java™ programs. Java™ programs are not run directly by the central processor but instead by the JVM™, which is itself a piece of software running on the processor. The JVM™ allows Java™ programs to be executed on a different platform as opposed to only one platform for which the code was compiled. Java™ programs are compiled for the JVM™. In this manner, Java™ is able to support applications for many types of data processing systems, which may contain a variety of central processing units and operating system architectures.

To enable a Java™ application to execute on different types of data processing systems, a compiler typically generates an architecture-neutral file format—the compiled code is executable on many processors, given the presence of the Java™ run-time system. The Java™ compiler generates bytecode instructions that are nonspecific to a particular computer architecture.

A bytecode is a machine independent code generated by the Java™ compiler and executed by a Java™ interpreter. A Java™ interpreter is part of the JVM™ that alternately decodes and interprets the bytecode or bytecodes. The bytecode instructions are designed to be easy to interpret on any computer and easily translated on the fly into native machine code. Bytecodes may be translated into native machine code by a just-in-time compiler or JIT.

The JVM™ loads the class files and executes the bytecodes within them. The class files are loaded by a class loader in the JVM™. The class loader loads class files from an application and the class files from the Java™ application programming interfaces (APIs) which are needed by the application. The execution engine that executes the bytecodes may vary across platforms and implementations.

One type of software-based execution engine is the just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java™ bytecodes are executed natively. JVM™s usually interprets bytecodes but JVM™s may also use other techniques, such as just-in-time compiling, to execute bytecodes.

When an application is executed on the JVM™ that is implemented in software on a platform-specific operating system, a Java™ application may interact with the host operating system by invoking native methods. A Java™ method is written in the Java™ language, compiled to bytecodes, and stored in class files. A native method is written in some other language and compiled to the native machine code of a particular processor. Native methods are stored in a dynamically linked library whose exact form is platform specific.

Figure 4:
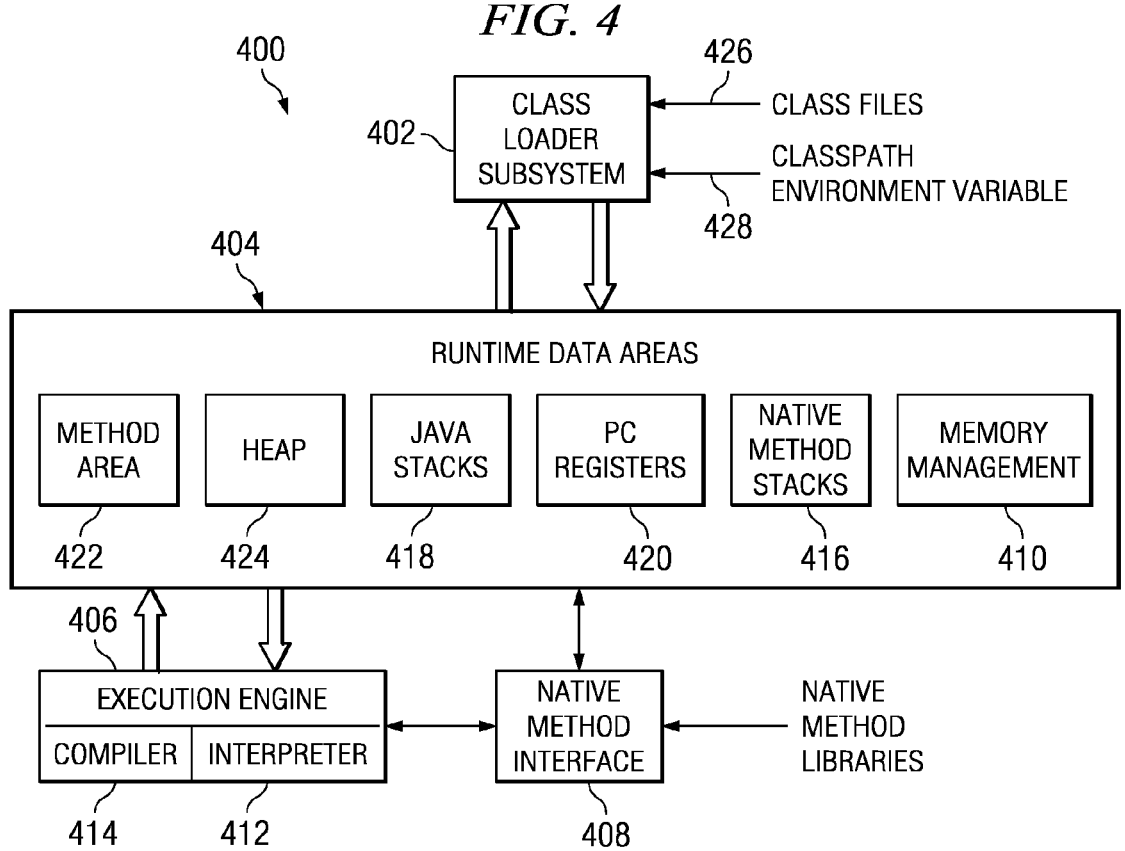
FIG. 4 is a block diagram of a Java™ virtual machine in accordance with an illustrative embodiment of the present invention.

With reference now to FIG. 4, a block diagram of a JVM™ is depicted in accordance with an illustrative embodiment of the present invention. JVM™ 400 includes class loader subsystem 402, which is a mechanism for loading types, such as classes and interfaces given fully qualified names. JVM™ 400 also contains runtime data areas 404, execution engine 406, native method interface 408, and memory management 410. Execution engine 406 is a mechanism for executing instructions contained in methods of classes loaded by class loader subsystem 402. Execution engine 406 may be, for example, Java™ interpreter 412 or compiler 414. Native method interface 408 allows access to resources in the underlying operating system. Native method interface 408 may be, for example, the Java™ Native Interface (JNI).

Runtime data areas 404 contain native method stacks 416, Java™ stacks 418, PC registers 420, method area 422, and heap 424. These different data areas represent the organization of memory needed by JVM™ 400 to execute a program.

Java™ stacks 418 are used to store the state of Java™ method invocations. When a new thread is launched, the JVM™ creates a new Java™ stack for the thread. The JVM™ performs only two operations directly on Java™ stacks: it pushes and pops frames. The thread's Java™ stack stores the state of Java™ method invocations for the thread. The state of the Java™ method invocation includes its local variables, the parameters with which it was invoked, its return value, if any, and intermediate calculations. Java™ stacks are composed of stack frames. A stack frame contains a state of a single Java™ method invocation. When a thread invokes a method, the JVM™ pushes a new frame onto the Java™ stack of the thread. When the method completes, the JVM™ pops the frame for that method and discards it. The JVM™ does not have any registers for holding intermediate values; any Java™ instruction that requires or produces an intermediate value uses the stack for holding the intermediate values. In this manner, the Java™ instruction set is well defined for a variety of platform architectures.

Program counter (PC) registers 420 are used to indicate the next instruction to be executed. Each instantiated thread gets its own PC register and Java™ stack. If the thread is executing a JVM™ method, the value of the PC register indicates the next instruction to execute. If the thread is executing a native method, then the contents of the PC register are undefined. Native method stacks 416 store the state of invocations of native methods. The state of native method invocations is stored in an implementation-dependent way in native method stacks, registers, or other implementation-dependent memory areas. In some JVM™ implementations, native method stacks 416 and Java™ stacks 418 are combined.

Method area 422 contains class data while heap 424 contains all instantiated objects. The constant pool is located in method area 422 in these examples. The JVM™ specification strictly defines data types and operations. Most JVM™s choose to have one method area and one heap, each of which are shared by all threads running inside the JVM™, such as JVM™ 400. When JVM™ 400 loads a class file, it parses information about a type from the binary data contained in the class file. JVM™ 400 places this type of information into the method area. Each time a class instance or array is created, the memory for the new object is allocated from heap 424. JVM™ 400 includes an instruction that allocates memory space within the memory for heap 424 but does not include instructions for freeing space within the memory. Memory management 410 in the depicted example manages memory space within the memory allocated to heap 424. Memory management 410 may include a garbage collector, which automatically reclaims memory used by objects that are not referenced. Additionally, a garbage collector also may move objects to reduce heap fragmentation.

Currently, a Java™ class loader in class loader subsystem 402 loads class files 426 in order to execute a Java™ program. The Java™ class loader identifies class files 426 that are required by the Java™ program by traversing classpath environment variable 428. Classpath environment variable 428 tells the Java™ class loader in JVM™ 400 where to find class files 426, including user-defined class files to load. The Java™ class loader traverses the classpath environment variable and examines all of the directories or JAR files in the classpath environment variable to determine if the required class files are present. However, as the number of directories and JAR files to be examined increases in the classpath environment variable, class loading efficiency suffers because there are more and more directories or JAR files to search through. In addition, if the Java™ program is executed repeatedly, the time spent on searching for the required classes may affect performance of the program.

Aspects of the present invention provide a computer implemented method, data processing system, and computer usable program code for classpath optimization by generating a new classpath environment variable that only include elements containing classes that are required by a current Java™ program. These elements include directories and JAR files. In an illustrative embodiment, aspects of the present invention may be implemented in a Java™ class loader within class loader subsystem 402 of JVM™ 400 in FIG. 4.

Turning now to FIG. 5, a diagram illustrating a known script for setting the classpath environment variable is depicted. As shown in FIG. 5, script 500 sets the classpath environment variable 501 to include every directory and JAR file that is in a user environment. This includes a library in /home/utexas/staff/mausolf/mycondor directory 502, each file in each jar file of the library 504, and a rt.jar file in the /usr/java/j2sdk1.4.1_05/jre/lib directory 506. Thus, everything in the user environment, including all of the directories and JAR files, are included in the classpath environment variable regardless of whether it is relevant to a current Java™ program.

Turning now to FIG. 6, a diagram illustrating a known classpath environment variable generated using a known script is depicted. After script 500 in FIG. 5 is run, classpath environment variable 600 is generated. Classpath environment variable 600 includes every directory and JAR file in the user environment including those that are not relevant to the current Java™ program.

To avoid examining all directories or JAR files identified in the classpath environment variable that are irrelevant to the program, the aspects of the present invention generate a new classpath environment variable by including only those directories or JAR files that contain classes that are required by the current Java™ program. The aspects of the present invention generate the new classpath environment variable by examining the import statements in the source code for the current Java™ program and removing directories or JAR files that do not contain classes identified in the import statements. An import statement includes the source code of another file into the source code of the current file.

The import statements in the source code specify classes that are required for the Java™ program. For example, import com.ibm.my_project.*statement indicates all class files within the directory com/ibm/my_project are required for the Java™ program. If dependencies exist in the required class files of the import statements, the aspects of the present invention examine the required class files themselves in a recursive manner until all required classes are identified. In order to identify directories or JAR files in the import statements to be removed, aspects of the present invention examine each of the import statements to identify the required class files.

Next, the aspects of the present invention search each directory identified in the classpath environment variable for the required class files. If none of the required class files are present in the directory, the fully qualified name of the JAR file in the directory is removed from the classpath environment variable. If the classpath environment variable includes JAR files, the aspects of the present invention searches each JAR file identified in the classpath environment variable for the required class files by utilizing a "jar-tvf" command. The "jar-tvf" command lists the content of a JAR file. If none of the required class files is present in the JAR file, the JAR file is removed from the classpath environment variable.

The aspects of the present invention continue to search for the required class files until the required class files are located. Once all of the required class files in the import statements are located, a new classpath environment variable is generated with the remaining directories or JAR files in the classpath environment variable. In other words, the new classpath environment variable only includes those directories or JAR files that contain the required classes. In this way, the time spent searching for the required classes in the classpath environment variable may be minimized and the Java™ class loader may locate and load the required classes faster.

Turning now to FIG. 7, a diagram illustrating a known classpath environment variable is depicted. As shown in FIG. 7, classpath environment variable 700 identifies two directories where the JVM™ may find the class files. In this example, the two directories are /user/local/classes 702 and /user/local/lib 704. Within each of the two directories, there may be hundreds of class files and libraries. Thus, searching through the two directories for class files at runtime may be time consuming.

Turning now to FIG. 8, a diagram illustrating a known Java™ program source file is depicted. As shown in FIG. 8, Java™ program source code 800 includes two import statements, which indicate the class files that are required by the current Java™ program. The two import statements are import statements 802 and 804. Import statement 802 indicates that class file com.ibm.my_project.registration is required. Import statement 804 indicates that class file com.ibm.my_project.utilities is required.

Currently, the Java™ class loader searches through hundreds of class files and libraries in directories 702 and 704 in FIG. 7 to find the required class files as indicated in import statements 802 and 804 in FIG. 8. In order to avoid searching through all of the files and libraries, aspects of the present invention generate a new classpath environment variable that includes only directories and JAR files that contain the required class files, such that the search time may be reduced.

In order to generate the new classpath environment variable, aspects of the present invention examine each of import statements 802 and 804 in FIG. 8 to identify required class files com.ibm.my_project.registration and com.ibm.my_project.utilities. Next, the aspects of the present invention search each directory identified in the classpath environment variable, /user/local/classes 702 and /user/local/lib 704 for the required class files. If none of the required class files are present in the directory, the fully qualified name of a JAR file in the directory is removed from the classpath environment variable. For example, if no com.ibm directory exists in /user/local/classes 702, the fully qualified name of the JAR file in /user/local/classes directory 702 is removed from the classpath environment variable, such that the directory would not be searched by the Java™ class loader.

On the other hand, /user/local/lib 704 includes a plurality of JAR files, including my_project.jar. The aspects of the present invention searches each JAR file identified in /user/local/lib 704 for the required class files by utilizing a jar-tvf command. The jar-tvf command lists the contents of a JAR file. For example, a "jar-tvf|grep com.ibm.my_project" command is used to list the contents of the my_project.jar.

Based on the list of contents, the aspects of the present invention determines if the required class files com.ibm.

my_project.registration and com.ibm.my_project.utilities are present in my_project.jar. If the required class files are absent, the fully qualified path name of the jar file in the directory is removed from the classpath environment variable. However, if the required class files are present, a new classpath environment variable is generated with only the directories or JAR files that contain the required class files.

Turning now to FIG. 9, a diagram illustrating an exemplary classpath environment variable is depicted in accordance with an illustrative embodiment of the present invention. As shown in FIG. 9, new classpath environment variable 900 is generated by the aspects of the present invention after traversing classpath environment variable 700 and removing any directories or JAR files that do not contain the required class files for the current Java™ program 800, as described above.

New classpath environment variable 900 includes only two JAR files: /user/local/lib/runtime.jar 902 and /user/local/lib/my_project.jar 904. In this example, runtime.jar 902 is needed by the Java™ runtime environment. My_project.jar 904 is a single JAR file that is required by program 800. Instead of searching through hundreds of class files and libraries in /user/local/classes 802 and each JAR file in /user/local/lib 804 as shown in FIG. 8, the Java™ class loader may simply load runtime.jar 902 and my_project.jar 904 to execute program 800. Once the new classpath environment variable 900 is generated, it may be stored in a classpath file with a name of the current Java™ program and a .classpath extension. For example, test.classpath.

In one illustrative embodiment, when the user invokes the program, such as program 800, the program is manually invoked by using a "java-c" command with the parameter "new_classpath" program_name. For example, "java-c test.classpath test". The "java-c" command specifies the classpath to be used by the Java™ class loader. In an alternative embodiment, when the user invokes the program, the Java™ runtime environment looks for a classpath file with the program name "test" followed by the .classpath extension. If the classpath file is found, the new classpath environment variable is set for the program and the program is invoked using the new classpath environment variable. However, if the classpath file is not found, the aspects of the present invention may generate a new classpath file automatically according to the steps as described above. The aspect of the present invention then uses the new classpath file to invoke the program and saves the classpath file with a .classpath extension for subsequent use. However, the automatic generation of optimized classpath environment variable is optional. For programs that are run infrequently, the user may not want the overhead of optimizing the classpath environment variable each time the program is run. On the other hand, if the program is invoked frequently and is time sensitive, the user may want to optimize the classpath environment variable such that each subsequent execution of the program will take less time and be more efficient. This efficiency is achieved because the optimized classpath environment variable is only generated once for the program, but is subsequently used each time the program is run.

Turning now to FIG. 10, a flowchart of an exemplary process for classpath environment variable optimization is depicted in accordance with an illustrative embodiment of the present invention. This process may be implemented within a Java™ class loader within a class loader subsystem, such as class loader subsystem 402 of JVM™ 400 in FIG. 4.

As shown in FIG. 10, from the perspective of the Java™ class loader, the process begins when aspects of the present invention examines the import statements of the Java™ program to identify class files that are required by the program (step 1000). Next, aspects of the present invention search the next directory that is identified in the classpath environment variable for the required class files (step 1002). A determination is made by aspects of the present invention as to whether the directory contains the required class files (step 1004). If the directory contains the required class files, the directory is included in the new classpath environment variable (step 1006). If the directory does not contain the required class files, the aspects of the present invention remove the fully qualified name of the JAR file in the directory from the classpath environment variable (step 1008).

A determination is then made as to whether additional directories are present in the classpath environment variable (step 1010). If additional directories are present, the process returns to step 1002 to search the next directory for the required class files. However, if additional directories are not present, the aspects of the present invention search the next JAR file identified in the classpath environment variable for the required class files using the "jar-tvf" command (step 1012). The "jar-tvf" command lists the contents of the JAR file.

A determination is then made as to whether the contents of the JAR file contain the required class files (step 1014). If the JAR file contains the required class files, the JAR file is included in the new classpath environment variable (step 1016). If the JAR file does not contain the required class files, the aspects of the present invention remove the JAR file from the classpath environment variable (step 1018).

Next, a determination made as to whether additional JAR files are present in the classpath environment variable (step 1020). If additional directories are present, the process returns to step 1012 to search the next JAR file for the required class files. However, if additional JAR files are not present, the aspects of the present invention generate the new classpath environment variable with the directories and JAR files that contain the required class files (step 1022). The new classpath environment variable is then stored in a classpath file with the program name and .classpath extension (step 1024).

Later, when the user invokes the Java™ program (step 1025), in one embodiment, the Java™ runtime environment looks for a classpath file with a program name followed by a .classpath extension (step 1026). A determination is made by the Java™ runtime environment as to whether the classpath file exists (step 1028). If the classpath file exists, the program is invoked by using a "java-c "new_classpath" program_name" command (step 1030). The new_classpath is the name of the classpath file stored with the new classpath environment variable in step 1024. Thus, the process terminates thereafter. However, if the classpath file does not exist, the process may return to step 1000 and repeat the steps to automatically generate a new classpath environment variable. Instead of having to search through all of the directories and JAR files in the classpath environment variable each time a repeatedly executed program is executed, the new classpath environment variable in the classpath file may be used repeatedly by the Java™ runtime environment.

It is noted that automatic generation of a new classpath environment variable is optional. For programs that are run infrequently, the user may not want the overhead of optimizing the classpath environment variable. On the other hand, if the program is invoked frequently and is time sensitive, the user may want to optimize the classpath environment variable such that each subsequent execution of the program will be more efficient. This efficiency is achieved because the optimized classpath environment variable is only generated once for the program, but is subsequently used each time the program is run. Thus, the optimized classpath environment variable does not have to be generated for a program that is run infrequently or that is not time-sensitive.

In addition to including only directories and JAR files that contain the required classes, other types of classpath optimizations may be performed. For example, the classpath environment variable may be reordered starting from directories or JAR files with the highest number of classes to directories or JAR files with the lowest number of classes. By reordering the classpath environment variable based on the number of classes the directories or JAR files contain, the likelihood that the required class files are found early in the search process is increased because the probability that the required classes are found is higher in a bigger set of directories and JAR files than a smaller set of directories and JAR files. This optimization decreases the search time of the Java™ class loader and the execution time of the program, hence, improves the program performance.

Figure 11:
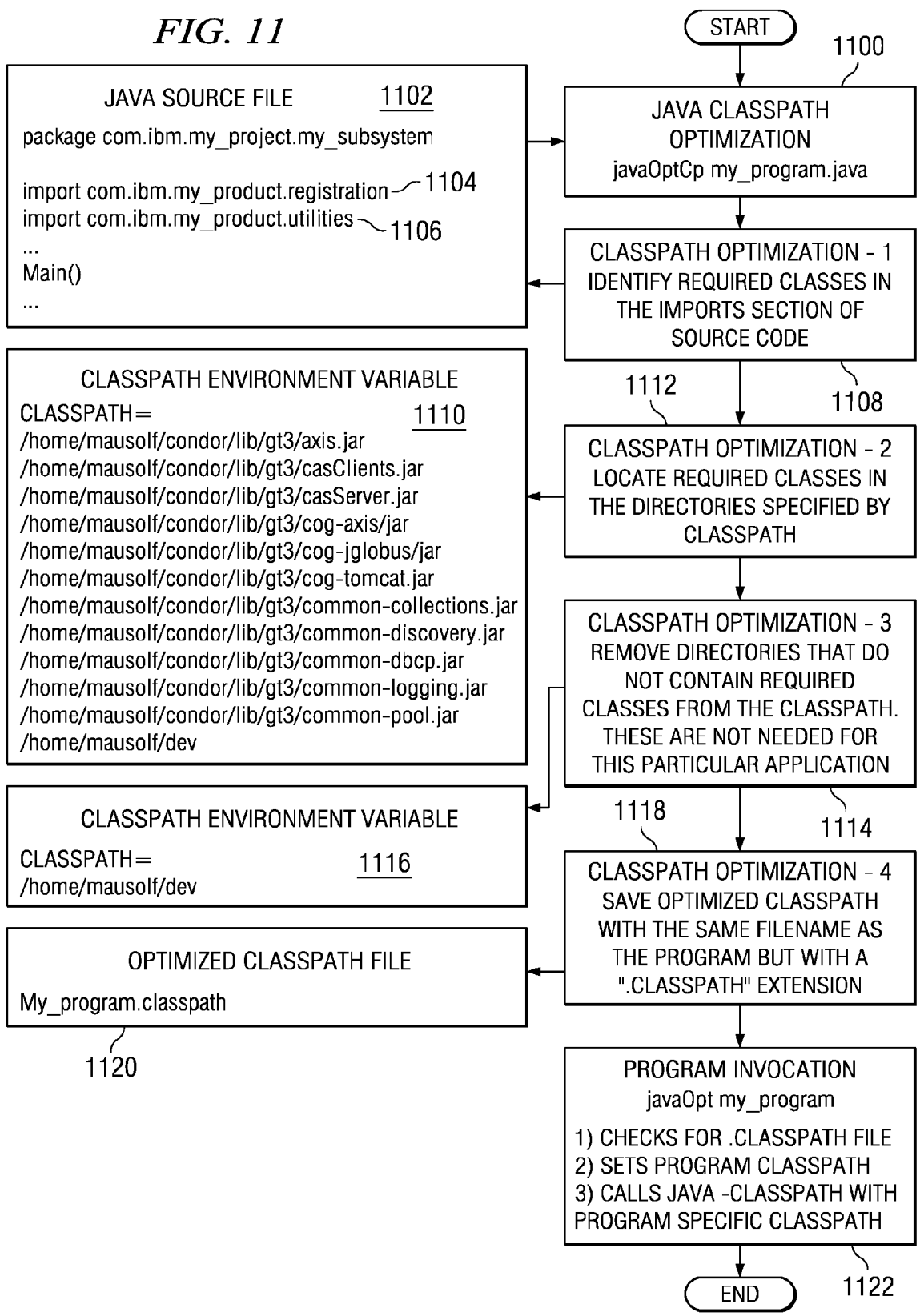
FIG. 11 is an exemplary implementation of classpath environment variable optimization in accordance with an illustrative embodiment of the present invention.

Turning now to FIG. 11, an exemplary implementation of classpath environment variable optimization is depicted in accordance with an illustrative embodiment of the present invention. This exemplary implementation utilizes the process as depicted in FIG. 10. As shown in FIG. 11, the optimization process begins when a user invokes an optimization command "javaOptCp" to optimize the classpath environment variable for a Java™ program named "my_program.java" (step 1100). Java™ source file 1102 includes two import statements, which specify two required class files: com.ibm.my_project.registration 1104 and com.ibm.my_project.utilities 1106.

Upon receiving the "javaOptCp" command, aspects of the present invention identify the required classes in the import section in source code of Java™ source file 1102 (step 1108). The aspects of the present invention then locate the required classes in the directories as specified by classpath environment variable 1110 (step 1112). Classpath environment variable 1110 includes directories and JAR files that are required by different Java™ programs. Once the required classes are located, the aspects of the present invention remove the directories that do not contain required classes from the classpath environment variable (step 1114), since these directories are not required for this particular program, my_program.java. New classpath environment variable 1116 is generated by aspects of the present invention as a result, which includes only "/home/mausolf/dev" directory 1116.

Aspects of the present invention then save the new classpath environment variable in an optimized classpath file with the same filename as the Java™ program but with a .classpath extension (step 1118). In this example implementation, the optimized classpath file is My_program.classpath 1120. Once the new classpath environment variable is saved in the classpath file, the classpath optimization process completes.

Later, the user invokes the Java™ program by using a "javaOpt" command (step 1122). The "javaOpt" command looks for a classpath file with a .classpath extension of the program name. If the classpath file is found, the command sets the program classpath to the new classpath environment variable in the classpath file by calling a "java-classpath" command. By using the "javaOpt" command, search time by the Java™ class loader may be minimized. The program then executes and the program invocation process terminates.

It is noted that classpath optimization steps 1100, 1108, 1112, 1114, and 1118 in FIG. 11 are executed only once to optimize the classpath, while program invocation step 1122 in FIG. 11 may be executed multiple times for a program that is executed repeatedly. It is also noted that the classpath file is unique to a program. Thus, each program is associated with a different classpath file.

In summary, the aspects of the present invention optimizes Java™ program performance, in particular repeatedly executed Java™ program performances, by dynamically filtering and reordering the classpath. The aspects of the present invention create an optimized classpath that is specific to a particular program in advance of program execution. Furthermore, the aspects of the present invention may be integrated with enterprise development tools, such as Eclipse, to optimize the performance of programs during their development. In this manner, the optimized classpath may be deployed all of the way from the development phase to production phase along with the application such that the optimization is separate from the time-sensitive processing of the production resources.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer readable data storage medium can be any apparatus that can store the program for use by or in connection with the instruction execution system, apparatus, or device.

The data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for classpath environmental variable optimization in a platform independent runtime environment, the method comprising the steps of:
a computer identifying a required class in an import statement in source code for a software program, wherein the required class is required by the software program;
the computer identifying an element containing the required class in the classpath environment variable to form an identified element, wherein the identified element includes at least one of a directory element and an archive file element; and
the computer generating a new classpath environment variable using the identified element;
wherein if the identified element includes the directory element, the step of the computer identifying the element containing the required class in the classpath environment variable comprises:
the computer determining if a directory listed in the classpath environment variable contains the required class and if so, the computer including a name of the directory in the new classpath environment variable, or if not, the computer removing the name of the directory from the classpath environment variable; and
wherein if the identified element includes the archive file element, the step of the computer identifying the element containing the required class in the classpath environment variable comprises:
the computer determining if an archive file listed in the classpath environment variable contains the required class and if so, the computer including a name of the archive file in the new classpath environment variable, or if not, the computer removing the name of the archive file from the classpath environment variable.

2. The method of claim 1, further comprising the steps of:
the computer storing the new classpath environment variable in a classpath file, wherein the classpath file has a name of the software program and a classpath extension;
responsive to a user invoking the software program, the computer determining if a classpath file with a name of the software program and a .classpath extension is present; and
if the classpath file with a name of the software program and a .classpath extension is present, the computer invoking the software program using the classpath file.

3. The method of claim 2, wherein the invoking step comprises:
the computer setting a runtime environment of the software program to the new classpath environment variable; and
the computer loading at least one class that is required by the software program using the new classpath environment variable.

4. The method of claim 2, wherein the classpath file is specific to the software program.

5. The method of claim 1, wherein the step of determining if the archive file listed in the classpath environment variable contains the required class comprises:
the computer listing contents of the archive file using a java-tvf command; and
the computer examining contents of the archive file to determine if the archive file contains the required class.

6. The method of claim 1, further comprising the steps of:
the computer reordering directories and archive files in the classpath environment variable starting from directories and archive files with a largest number of classes to directories and archive files with a least number of classes.

7. The method of claim 1, wherein the computer performs the first identifying, second identifying, and the generating steps once prior to an execution of the software program.

8. A data processing system for classpath environmental variable optimization in a platform independent runtime environment, the data processing system comprising:
one or more computer-readable tangible storage devices, one or more processors, and one or more computer-readable memories;
program instructions, stored on at least one of the one or more computer-readable tangible storage devices for execution by at least one of the one or more processors via at least one of the one or more computer-readable memories, to identify a required class in an import statement in source code for a software program, wherein the required class is required by the software program;
program instructions, stored on at least one of the one or more computer-readable tangible storage devices for execution by at least one of the one or more processors via at least one of the one or more computer-readable memories, to identify an element containing the required class in the classpath environment variable to form an identified element, wherein the identified element includes at least one of a directory element and an archive file element; and
program instructions, stored on at least one of the one or more computer-readable tangible storage devices for execution by at least one of the one or more processors via at least one of the one or more computer-readable memories, to generate a new classpath environment variable using the identified element;
wherein the program instructions to identify the element containing the required class in the classpath environment variable comprise:
program instructions, responsive to the identified element including the directory element, to determine if a directory listed in the classpath environment variable contains the required class and if so, to include a name of the directory in the new classpath environment variable, or if not, to remove the name of the directory from the classpath environment variable; and
program instructions, responsive to the identified element including the archive file element, to determine if an archive file listed in the classpath environment variable contains the required class and if so, to include a name of the archive file in the new classpath environment variable, or if not, to remove the name of the archive file from the classpath environment variable.

9. The data processing system of claim 8, further comprising:
program instructions, stored on at least one of the one or more computer-readable tangible storage devices for execution by at least one of the one or more processors via at least one of the one or more computer-readable memories, to store the new classpath environment variable in a classpath file, wherein the classpath file has a name of the software program and a classpath extension and is specific to the software program;

program instructions, stored on at least one of the one or more computer-readable tangible storage devices for execution by at least one of the one or more processors via at least one of the one or more computer-readable memories, to determine if a classpath file with a name of the software program and a .classpath extension is present responsive to user invoking the software program; and program instructions, stored on at least one of the one or more computer-readable tangible storage devices for execution by at least one of the one or more processors via at least one of the one or more computer-readable memories, to invoke the software program using the classpath file if the classpath file with a name of the software program and a .classpath extension is present.

10. The data processing system of claim 8, further comprising:

program instructions, stored on at least one of the one or more computer-readable tangible storage devices for execution by at least one of the one or more processors via at least one of the one or more computer-readable memories, to reorder directories and archive files in the classpath environment variable starting from directories and archive files with a largest number of classes to directories and archive files with a least number of classes.

11. The data processing system of claim 8, wherein the program instructions to identify the required class, the program instructions to identify the element, and the program instructions to generate the new classpath environment variable are executed by at least one of the one or more processors once prior to an execution of the software program by at least one of the one or more processors.

12. A computer program product for classpath environmental variable optimization in a platform independent runtime environment, said computer program product comprising:

one or more computer-readable tangible storage devices;

program instructions, stored on at least one of the one or more computer-readable tangible storage devices, to identify a required class in an import statement in source code for a software program, wherein the required class is required by the software program;

program instructions, stored on at least one of the one or more computer-readable tangible storage devices, to identify an element containing the required class in the classpath environment variable to form an identified element, wherein the identified element includes at least one of a directory element and an archive file element; and program instructions, stored on at least one of the one or more computer-readable tangible storage devices, to generate a new classpath environment variable using the identified element;

wherein the program instructions to identify the element containing the required class in the classpath environment variable comprise:

program instructions, responsive to the identified element including the directory element, to determine if a directory listed in the classpath environment variable contains the required class and if so, to include a name of the directory in the new classpath environment variable, or if not, to remove the name of the directory from the classpath environment variable; and program instructions, responsive to the identified element including the archive file element, to determine if an archive file listed in the classpath environment variable contains the required class and if so, to include a name of the archive file in the new classpath environment variable, or if not, to remove the name of the archive file from the classpath environment variable.

13. The computer program product of claim 12, further comprising:

program instructions, stored on at least one of the one or more computer-readable tangible storage devices, to store the new classpath environment variable in a classpath file, wherein the classpath file has a name of the software program and a classpath extension;

program instructions, stored on at least one of the one or more computer-readable tangible storage devices, to, responsive to a user invoking the software program, determine if a classpath file with a name of the software program and a .classpath extension is present; and program instructions, stored on at least one of the one or more computer-readable tangible storage devices, to invoke the software program using the classpath file if the classpath file with a name of the software program and a .classpath extension is present.

14. The computer program product of claim 12, further comprising:

program instructions, stored on at least one of the one or more computer-readable tangible storage devices, to reorder directories and archive files in the classpath environment variable starting from directories and archive files with a largest number of classes to directories and archive files with a least number of classes.

* * * * *